Figure 1:
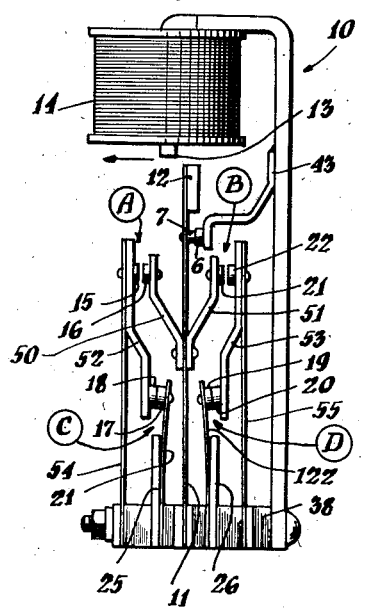

Jan. 21, 1958   R. E. BARNES   2,820,910
VOLTAGE REGULATING VIBRATOR
Filed Dec. 14, 1955

INVENTOR
Robert E. Barnes
BY
ATTORNEY

United States Patent Office 2,820,910
Patented Jan. 21, 1958

2,820,910

VOLTAGE REGULATING VIBRATOR

Robert E. Barnes, Indianapolis, Ind., assignor to P. R. Mallory & Co., Inc., Indianapolis, Ind., a corporation of Delaware Application December 14, 1955, Serial No. 552,994

13 Claims. (Cl. 307—150)

This invention relates generally to electrical translating apparatus and has particular reference to such means and methods including translating apparatus for transferring energy between direct and alternating current circuits.

Interrupter devices, more generally known as vibrators, have been extensively used for translating direct current energy into alternating current energy or into direct current energy of a different voltage. These interrupters or vibrators have power supplies which are usually adapted to operate from battery power sources, such as those used in automobile electrical systems. In such a system the terminal voltage varies widely. For example, it is not uncommon to encounter a voltage regulation as high as 25% or 30% at the input terminals of a vibrator power supply. Moreover, the characteristics of conventional vibrators and their associated circuits are such that the output voltage is almost directly proportional to the input voltage. Therefore, the output voltage regulation of a vibrator power supply is proportional to the voltage regulation of the power source unless special voltage regulating devices are incorporated into the power supply circuit.

In general, such voltage regulating devices are often bulky and cumbersome so that appreciably more volume must be occupied by a voltage regulator power supply than by an equivalent unregulated power supply. Furthermore, such voltage regulating devices often consume appreciable amounts of power, making the overall power supply efficiency low.

It is therefore an object of the present invention to provide a power supply including its associated vibrator wherein the output voltage remains substantially constant over a widely varying input voltage range.

It is another object of the present invention to provide voltage regulation in a vibrator power supply without the utilization of cumbersome voltage regulating devices which often consume appreciable amounts of power.

Still another object of the present invention is to provide voltage regulation for a vibrator and its power supply wherein voltage regulation is encompassed in a simplified and extremely practical manner without incorporating in such a power supply and vibrator system complicated equipment which often consumes appreciable amounts of power and, as a consequence, would normally make for an overall vibrator power supply efficiency which would be extremely low.

Yet another object of the present invention is to provide means which, besides giving good voltage regulation characteristics, can also be adapted and incorporated into the design and manufacture of new vibrator power supplies and also can adapt and modify existing unregulated power supply equipment in an extremely simple and rapid manner.

Another object of the present invention is to provide means and methods for converting unregulated power supply systems for vibrators to regulated systems in an efficient, simple and practical manner.

It is another object of the present invention to provide means for converting vibrator power supplies which are unregulated to power supplies which are regulated as to their output voltage in vibrator circuits, such conversion being effective without any substantial wiring changes in the equipment.

Still another object of the present invention is to present a new and novel vibrator which is adapted to provide voltage regulatory characteristics in both new and old vibrator power supply circuits, said old circuits being thus rapidly, efficiently and practically converted to a regulatory system wherein the output voltage is maintained substantially constant over a wide range.

Still another object of the present invention is to provide a new and novel regulatory power supply system for vibrators wherein the input to the vibrator may be regulated in a manner such that the output voltage issuing therefrom shall remain constant over a substantially wide variation of the input voltage.

The invention in another of its aspects relates to novel features of the instrumentalities described herein for teaching the principal objects of the invention and to the novel principles employed in the instrumentalities, whether or not these features and principles may be used in the said object and/or in the said field.

Other objects of the invention and the nature thereof will become apparent from the following description, considered in connection with the accompanying figures of the drawing and wherein the scope of the invention is determined from the dependent claims.

Figure 2:
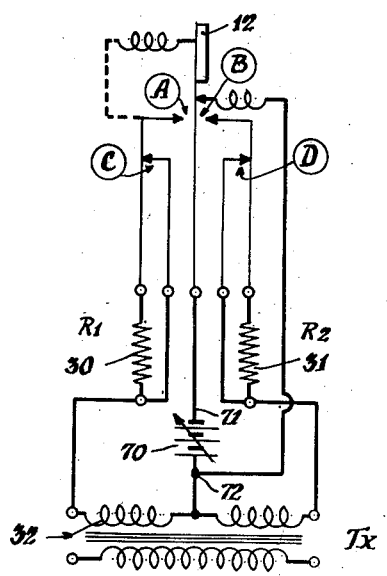
Figure 3:
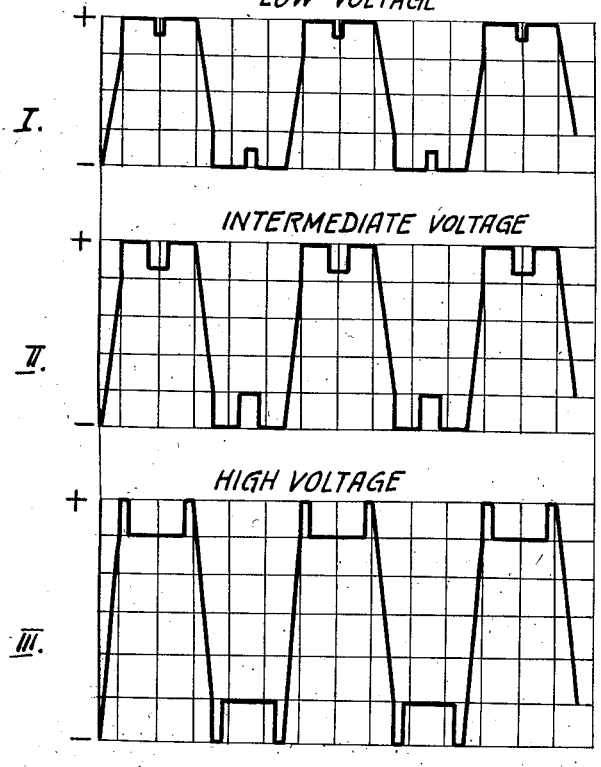

Referring now to the figures of the drawing:

Fig. 1 is a side elevational view of the vibrator invention incorporating the use of contacts for obtaining voltage regulation in the output thereof and is adapted to show the mechanism whereby such regulation is obtained;

Fig. 2 is a schematic electrical circuit diagram as adapted to illustrate the electrical circuit arrangement of the mechanical structure as shown in Fig. 1 and as adapted to give a constant output voltage from said vibrator; and Fig. 3 shows graph curves illustrating the voltage regulation accomplished by the system as described in Figs. 1 and 2 wherein the regulation is obtained for low voltage, intermediate voltage and high voltage inputs thereto.

Generally speaking, the present invention comprises apparatus and means whereby good output voltage characteristics are obtained as a result of a steady and/or constant voltage output being effectuated in relation to the deflection of the reed structure utilized in the vibrator. In accordance with the invention, sets of contacts are adjusted so that the period and time that these contacts will remain closed directly translates the aforesaid time and amplitude of reed vibration and contact closure into a function which gives a proportionality such that the output from the vibrator is strictly correlated thereto and, as a result, the variations of output voltage may be regulated thereby.

Referring now to Fig. 1 of the drawing, there is pictorially illustrated a generall structure of one type of a vibratory mechanism, together with its associated power supply circuit, including the transformer primary. This latter supply circuit is more aptly illustrated in Fig. 2. Further, in discussing Fig. 1, its electrical circuit as exemplified by Fig. 2 is to be concurrently reviewed, as well as the sketches of the waveforms shown by various voltages in Fig. 3. The operation and means for regulating the vibrator so as to give a susbtantially constant output voltage will be made clear thereby.

As illustrated in Fig. 1, a thin vibratory reed arm 11 is maintained in a stack assembly 38. At the free end of the reed, opposite its end held in the stack assembly, a weight 12 is placed. Weight 12 is moved in accordance with the magnetic effect exerted by pole piece 13 as excited by driver coil 14, which is connected to a suitable current supply source. Beneath weight 12 there is placed a contact 7 which is initially in closed relationship with fixed contact 6 staked to the hooked frame 43 of the vibrator. Riveted below the driver contact on the reed, at a point substantially midway thereon on either side thereof, are holders 50 and 51, having two portions offset from each other by an interconnecting sloped portion, thus giving each holder a step-like configuration, and giving both holders together the aspect of a sling. On the holders are individually placed contacts 16 and 21 of contact pairs A and B. These contacts 16 and 21 are adapted to mate with opposing contacts 15 and 22 of the pairs A and B. Contacts 15 and 22 are maintained in juxtaposition with respect to contacts 16 and 21 on arms 52 and 53, which are in turned welded to flat support arms 54 and 55, held in an upright manner in stack assembly 38. Arms 52 and 53, at their opposite points, support contacts 18 and 20. Arms 52 and 53, in a fashion similar to holders 50 and 51, include three portions, two of which lie in the same parallel plane, but are spaced from each other by an interconnecting, inclined portion. Thus, contacts 18 and 20 are spaced at a distance from support arms 54 and 55 to lie against opposing contacts 17 and 19, held on arms 121 and 122 maintained in stack assembly 38. Support arms 121 and 122 are maintained against spring stops 25 and 26, also held in stack assembly 38.

The vibrator mechanism 10 is to be considered in steady state condition with its reed 11 in the position as indicated. The reed is to be taken as moving in the direction of the arrow wherein the reed weight 12 is moving toward the pole tip 13 of the driver coil 14, as shown. By referring to the drawing, it becomes evident that contacts 15 and 16 of contact pair A will close as soon as the reed is deflected a short distance from the position indicated in the drawing. Contacts 17 and 18 of contact pair C and contacts 19 and 20 of contact pair D are adjusted so that they are normally in a closed position and under sufficient tension so that the innermost spring contact supports 121 and 122 are lifted off their respective spring stops 25 and 26. Therefore, as the reed is deflected further in the pull direction, contacts 17 and 18 will remain closed until a point in the deflection swing of the reed is reached where the innermost spring contact support 121 is resting substantially flat or up against its respective spring stop 25. At this point in the deflection swing, contact spring 121 will separate and remain separated from its associated contact spring 52 for all greater amplitudes of reed deflection in the direction as indicated. As the reed passes through its maximum deflection and begins to decrease, a point will be reached at which contacts 17 and 18 of contact pair C will close again. As the reed deflection decreases still further, contact pair C will remain closed under increasing tension, but a point will be reached at which the contacts 15 and 16 of contact pair A will separate. As the reed deflection reaches zero, the structure will again be in the position shown in Fig. 1 and the inertia of the armature 12 will cause deflection in a direction reverse to that indicated by the arrows. From examination of Fig. 1, it is apparent that the action of contacts 21 and 22 of contact pair B and contacts 19 and 20 of contact pair D, respectively, will be similar to the action described for the contacts in contact pairs A and C above.

As the input voltage 70 to a power supply increases, the vibrator coil voltage will experience a proportional increase, which will result in increased reed amplitude. The vibrator is designed and adjusted so that the coil power, spring compliance, spring bias, contact spacing, etc, are in such relationship that at some operating voltage at the input terminals of the vibrator power supply, contact pairs C and D do not quite open, or barely open, at the minimum voltage point. At this condition the waveform will appear as shown for graph I, illustrating the low voltage condition in Fig. 3 if the contacts barely open. If the contact pairs C and D do not quite open for this condition, the waveform will appear as a normal waveform for standard vibrator circuits, since the small notch shown in the drawings of Fig. 3 will not appear. This notch will not have an appreciable effect on the circuit operation at this condition, since it is of such short time duration. The electrical efficiency of this circuit at this input voltage is therefore not appreciably different from that of the equivalent unregulated circuit. Examination of the circuit shown in Fig. 1 will show that the "notch" is caused by the insertion of resistors 30 and 31, which have the effect of reducing the voltage applied to the transformer primary 32.

As the input voltage 70 increases at the power supply input terminals 71, 72, the reed amplitude increases, and the time that resistors 30 and 31 are inserted increases, since contact pairs C and D remain open for longer periods of time during the reed cycle. This causes the width of the notch in the waveform to increase so that at some intermediate voltage the waveform will appear as shown in graph II of Fig. 3. The depth of the notch is controlled by the size of resistors 30 and 31; if the proper values of resistors are chosen, then the change in notch width is proportional to the increase in input voltage so that output voltage regulation occurs.

As the input voltage 70 to the power supply continues to increase, the notch width continues to increase until the high voltage waveform condition shown in graph III of Fig. 3 occurs. If the input voltage increases beyond this point, proportional output voltage regulation cannot be obtained, since a proportional increase in notch width cannot be obtained. However, it is apparent that over a given range good output regulation can be obtained with poor input regulation. On the basis of laboratory tests, it was found that 2% output regulation could be obtained for 25% input regulation. This compares to an almost proportional input output regulation for an unregulated equivalent power supply. It is also possible to obtain negative regulation (output voltage decreases with increasing input voltage), if desired, by proper design and choice of insertion resistances 30 and 31.

In Fig. 1 contact pairs C and D have been illustrated positioned below contact pairs A and B, respectively, to make the operation of the mechanism more apparent. It should be understood that the same results can be achieved by placing contact pairs A and C side by side, and B and D side by side.

In Fig. 2 driving coil connections have been shown for both series drive and shunt drive systems. Examination of the circuit will show that the operation of the system with a series drive coil is the same as any other series drive vibrator. In ordinary or usual type of shunt drive vibrators, the system is sometimes limited to a smaller range of input voltage due to the fact that the shunt coil must start on the applied voltage, but has twice the applied voltage available during steady state running due to transformer action. From the circuit shown in Fig. 1, it is apparent that the shunt coil voltage will thus be partially regulated. Since regulation cannot take place until reed amplitude increases, and since the coil voltage cannot be perfectly regulated if it must increase, the coil voltage will be partially regulated. This will also tend to increase the output regulation, but in many cases this effect is overcome in the output by making $R_1 > R_2$. An advantage may be derived in the present shunt drive over the ordinary or usual type shunt drive vibrator in that the operating voltage range is increased somewhat.

Another advantage of the present invention is that it makes available a convenient means of converting existing vibrator power supplies to regulated power supplies. A study of the circuit diagram of Fig. 2 will show that resistors $R_1$ and $R_2$, if desired, may be mounted on the vibrator container and plugged into a power supply vibrator socket having the usual three or four connections. Still another conversion possibility would be to place the insertion resistors in a container with a plug to fit the vibrator socket and with a socket to receive the vibrator plug. In new equipment the resistors would then be permanently wired in the power supply proper.

The present invention of a voltage regulating vibrator is intended merely to be illustrative of the applicant's invention and does not intend to restrict the scope thereof.

I claim:

1. A voltage regulatory type of vibrator comprising a vibratory reed mounted in a stack at one end thereof, said reed having an armature at its free end disposed opposite thereto, a coil adapted to have a current supplied thereto so as to influence said armature and to move said reed, contacts attached individually on each side of said reed, side contacts mating therewith, and a plurality of pairs of contacts, a pair of said contacts disposed on each side of said vibratory reed having a resistance of predetermined value connected thereto for obtaining negative, positive and flat voltage regulation characteristics in said vibrator as desired.

2. A voltage regulatory type of vibrator comprising a vibratory reed mounted in a stack at one end thereof, said reed having an armature at its other free end disposed opposite to said one end, a coil adapted to have a current supplied thereto so as to influence said armature and to move said reed, a set of contacts attached individually on each side of said reed, side contacts mating therewith to form pairs of contacts therewith on each side of said reed, and a second group of pairs of contacts, one pair of said group of contacts being connected to a resistance disposed on each side of said vibratory reed to provide means cooperating with said other contacts for regulating the voltage output from said vibrator.

3. A voltage regulatory type of vibrator comprising a vibratory reed mounted in a stack at one end thereof, said reed having an armature at its other free end disposed opposite thereto, a coil adapted to have a current supplied thereto so as to influence said armature and to move said reed, a set of contacts attached to arms individually placed on each side of said reed, side contacts mating therewith to form pairs of contacts therewith on each side of said reed, said contacts in each of said pairs being separated from each other in open relationship therebetween, and a second group of pairs of contacts, one pair of said group of contacts being connected to a resistance disposed on each side of said vibratory reed and being in closed contact therewith to provide means in relationship to said other contacts for regulating the voltage output from said vibrator.

4. A voltage regulatory type of vibrator comprising a vibratory reed mounted in a stack at one end thereof, said reed having an armature at its other end disposed opposite thereto, a coil adapted to have a current supplied thereto so as to influence said armature and thus to move said reed, a set of contacts attached to arms individually placed on each side of said reed, side contacts at the end of support arms held by said stack mating therewith to form pairs of contacts therewith on each side of said reeds, said contacts in each of said pairs being separated from each other in open relationship therebetween, and a plurality of pairs of contacts, a pair of said plurality of contacts being connected to a resistance disposed on each side of said vibratory reed to provide means in relationship to said other contacts for regulating the voltage output from said vibrator.

5. A voltage regulatory type of vibrator comprising a vibratory reed mounted in a stack at one end thereof, said reed having an armature at its other end disposed opposite thereto, a coil adapted to have a current supplied thereto so as to influence said armature and to move said reed, a set of contacts attached to arms individually carried on each side of said reed, individual side contacts mating therewith situated at the end of a support arm, and a plurality of open pairs of contacts, one contact of each open pair placed at the opposite end of said support arm carrying said side contact, said other contact of each pair of contacts being placed at the end of a spring arm held in said stack to form closed pairs of contacts and a backing member lying thereagainst whereby voltage regulation is obtained in the output of said vibrator, a pair of said plurality of contacts disposed on each side of said vibratory reed to provide means in relationship to said other contacts for regulating the voltage output from said vibrator.

6. A voltage regulatory type of vibrator comprising a vibratory reed mounted in a stack at one end thereof, said reed having an armature at its free end disposed opposite thereto, a series connected coil adapted to have a current supplied thereto so as to influence said armature and to move said reed, a set of contacts attached individually on each side of said reed, side contacts mating therewith, and a plurality of pairs of contacts, a pair of said plurality of contacts disposed on each side of said vibratory reed to provide means in relationship to said other contacts for regulating the voltage output from said vibrator.

7. A voltage regulatory type of vibrator comprising a vibratory reed mounted in a stack at one end thereof, said reed having an armature at its free end disposed opposite thereto, a coil adapted to have a current supplied thereto so as to influence said armature and to move said reed, a set of movable contacts on arms attached individually on each side of said reed, side contacts normally open adapted to mate therewith at a point in the vibrator reed swing, and a plurality of pairs of contacts, a pair of contacts of said plurality disposed on each side of said vibratory reed normally being closed to provide means in relationship to said other contacts for regulating the voltage output from said vibrator, one contact of said latter pair being supported on a spring arm held in said stack with a backing member placed thereagainst.

8. A voltage regulatory type of vibrator comprising a vibratory reed mounted in a stack at one end thereof, said reed having an armature at its free end disposed opposite thereto, a shunt coil adapted to have a current supplied thereto so as to influence said armature and to move said reed, a set of contacts attached individually on each side of said reed, side contacts mating therewith, a plurality of pairs of contacts, a pair of said plurality of contacts disposed on each side of said vibratory reed, and resistor means connected in the circuit of said vibrator to provide means in relation to said contacts for regulating the voltage output from said vibrator.

9. A voltage regulatory type of vibrator comprising a vibratory reed mounted in a stack at one end thereof, said reed having an armature at its free end disposed opposite thereto, a coil adapted to have a current supplied thereto so as to influence said armature and to move said reed, a set of movable contacts on arms attached individually on each side of said reed, side contacts held on supports normally open adapted to mate with said movable contacts during the reed swing, and a plurality of pairs of contacts, a pair of contacts of said plurality disposed on each side of said vibratory reed normally being closed so as to provide means in relationship to said other contacts for regulating the voltage output from said vibrator.

10. A vibrator for use in converting direct current into pulsating current and adapted to maintain a substantially constant voltage output therefrom over a substantially wide variation of input voltage thereto, said vibrator comprising a vibratory reed having a free end, stack means for supporting the other end of said reed, a driver coil, a frame for holding said coil having one end connected to and supported by said reed supporting means, said frame having a contact arm having a contact thereupon, said frame further being bent to have a hook-like configuration including a dependent portion, said dependent portion penetrating said coil substantially at the center thereof, said portion having its end constructed as a magnetic pole piece, a weight placed at the free end of said reed cooperating with said pole piece to activate said reed upon excitation of said coil, a reed contact adapted to mate with said contact on the contact arm of said frame, movable contacts carried by said reed, said movable contacts held at the end of arms carried by said reed, side contacts adapted to meet with said latter contacts to form pairs of mating contacts, spring arms connected to said stack means for holding supporting arms for said side contacts, said supporting arms further having individual contacts placed at the opposing ends thereof, other contacts individually placed on spring arms held in said supporting means, said other contacts adapted to mate with the individual contacts placed at the opposing ends of said supporting arms to form second pairs of contacts therebetween, and backing members placed adjacent said spring arms, said pairs of contacts formed by said individual contacts having a predetermined initial spacing therebetween such that upon activation of the vibrator the power output therefrom will be substantially constant over a wide variation of voltage inputs.

11. A vibrator for use in converting direct current into pulsating current and adapted to maintain a substantially constant voltage output therefrom over a substantially wide variation of input voltage thereto, said vibrator comprising a vibratory reed having a free end, stack means for supporting the other end of said reed, a driver coil, a frame for holding said coil having one end connected to and supported by said reed supporting means, said frame having a contact arm having a contact thereupon, said frame further being bent to have a hook-like configuration including a dependent portion, said dependent portion penetrating said coil substantially at the center thereof, said portion having its end constructed as a magnetic pole piece, a weight placed at the free end of said reed cooperating with said pole piece to activate said reed upon excitation of said coil, a reed contact adapted to mate with said contact on said frame, movable contacts carried by said reed, said movable contacts held at the end of arms carried by said reed at a point below said weight thereof, side contacts adapted to mate with said latter contacts to form pairs of mating contacts, spring arms annexed to said stack means for holding supporting arms for said side contacts, said supporting arms further having individual contacts placed at the opposing ends thereof, other contacts individually placed on spring arms held in said supporting means, said other contacts adapted to mate with the individual contacts placed at the opposing ends of said arms to form second pairs of contacts therebetween, and backing members placed adjacent said spring arms, said pairs of contacts formed by said individual contacts having a predetermined initial spacing therebetween such that upon activation of the vibrator the power output therefrom will be substantially constant over a wide variation of voltage inputs.

12. A vibrator adapted to be used with an ordinary supply vibrator socket to be converted into one having voltage regulation characteristics, said vibrator comprising a vibratory reed mounted in a stack at one end thereof, said reed having an armature at its free end disposed opposite thereto, a coil adapted to have a current supplied thereto so as to influence said armature and to move said reed, a set of contacts attached individually on each side of said reed, side contacts mating therewith, a plurality of pairs of contacts, a pair of said plurality of contacts disposed on each side of said vibratory reed, and resistor means mounted on the container of said vibrator adapted to be connected into said ordinary vibrator supply socket so as to be connected to said contacts for regulating the voltage output from said vibrator.

13. A vibrator as in claim 12 wherein the resistor means are adapted to convert said vibrator into one having voltage regulating characteristics, said resistor means being included in a container having a plug adapted to fit said vibrator socket, and with a socket to receive said vibrator plug.

References Cited in the file of this patent

UNITED STATES PATENTS 2,235,316    Dressel               Mar. 18, 1941